(12) United States Patent
Margolin

(10) Patent No.: US 12,118,621 B2
(45) Date of Patent: Oct. 15, 2024

(54) HARDLINE THRESHOLD SOFTENING

(71) Applicant: PayPal, Inc., San Jose, CA (US)

(72) Inventor: Itay Margolin, Pardesiya (IL)

(73) Assignee: PAYPAL, INC., San Jose, CA (US)

( * ) Notice: Subject to any disclaimer, the term of this patent is extended or adjusted under 35 U.S.C. 154(b) by 393 days.

(21) Appl. No.: 17/408,797

(22) Filed: Aug. 23, 2021

(65) Prior Publication Data

US 2023/0076010 A1 Mar. 9, 2023

(51) Int. Cl.
*G06Q 40/12* (2023.01)

(52) U.S. Cl.
CPC .................................. *G06Q 40/12* (2013.12)

(58) Field of Classification Search
None
See application file for complete search history.

(56) References Cited

U.S. PATENT DOCUMENTS

| | | | | |
|---|---|---|---|---|
| 5,774,847 A | * | 6/1998 | Chu | G10L 25/78 704/239 |
| 2006/0095521 A1 | * | 5/2006 | Patinkin | G06Q 10/107 709/206 |
| 2008/0256103 A1 | * | 10/2008 | Fachan | G06F 16/1774 |
| 2008/0256545 A1 | * | 10/2008 | Akidau | G06F 9/466 718/104 |
| 2017/0286532 A1 | * | 10/2017 | Horowitz | G06F 16/2428 |
| 2018/0082208 A1 | * | 3/2018 | Cormier | G06N 5/048 |
| 2019/0156855 A1 | * | 5/2019 | Herbig | H03G 9/025 |
| 2020/0382324 A1 | * | 12/2020 | Pierscieniak | H04L 9/3268 |
| 2021/0056114 A1 | * | 2/2021 | Price | G06F 16/24578 |

\* cited by examiner

*Primary Examiner* — Fateh M Obaid

(74) *Attorney, Agent, or Firm* — HAYNES AND BOONE, LLP

(57) ABSTRACT

A first schema accessed is associated with a plurality of entities that are participants of an electronic system. Each entity has a corresponding attribute. Each of a first subset of the entities has a respective attribute value below a threshold. Each of a second subset of the entities has a respective attribute value above the threshold. According to the first schema, it is determined that data and/or transactions associated with the first and second subsets of the entities are processed using a first and a second model, respectively. A second schema is generated by softening the predefined threshold such that according to the second schema, data and/or transactions associated with the first subset of the entities and data and/or transactions associated with the second subset of the entities are each processed using both the first model and the second model. The second schema is implemented in the electronic system.

20 Claims, 8 Drawing Sheets

HARDLINE THRESHOLD SOFTENING

BACKGROUND

Field of the Invention

The present application generally relates to modeling for data processing. More particularly, the present application involves transforming a hardline threshold into a softened threshold for determining models used in data processing, according to various embodiments.

Related Art

Rapid advances have been made in the past several decades in the fields of computer technology and telecommunications. These advances have led to more and more operations being conducted online by various entities via electronic systems. Often times, the electronic systems (or their operators) need to divide various entities using the electronic systems into different segmentations, where the dividing is done based on the entities' attributes to improve processing of data. Conventionally, hardline thresholds of the attributes are used to divide the entities. Entities may then be sorted into one segmentation or another based on where their value of the attribute fall with respect to the hardline thresholds. However, hardline thresholds may be arbitrary and may not provide the most sensible demarcation for segmentation. Furthermore, sometimes two entities may be sorted into two different segmentations based on their attribute values, even though their attribute values are both close to the hardline threshold (e.g., one slightly above the threshold, while the other is slightly below the threshold). In such a scenario, the underlying difference between these two entities may be rather small, but this small difference is not reflected by their different segmentations due to the hardline thresholds. Thus, there are needs for a system and method to transform a hardline threshold into a softened threshold that is capable of better capturing the underlying differences between the entities involved in electronic operations.

Figure 1:
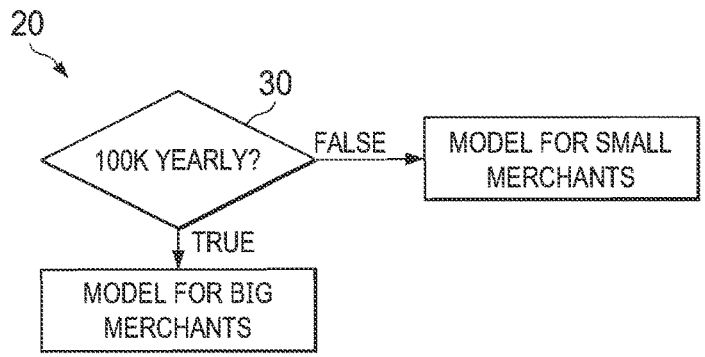
FIG. 1 is a block diagram illustrating a hardline threshold.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

It is to be understood that the following disclosure provides many different embodiments, or examples, for implementing different features of the present disclosure. Specific examples of components and arrangements are described below to simplify the present disclosure. These are, of course, merely examples and are not intended to be limiting. Various features may be arbitrarily drawn in different scales for simplicity and clarity.

The present disclosure pertains to transforming hardline thresholds into softened thresholds for determining models used in data processing. In more detail, modern day electronic systems or platforms may categorize their respective users or associated entities into different segmentations based on the attributes of the users or entities. Conventionally, such categorizations or segmentations are done using hardline thresholds. As a non-limiting example, an online marketplace may set a hardline threshold of $100,000 of annual revenue to separate large merchants and small merchants from one another. That is, merchants who have an annual revenue greater than or equal to $100,000 on the online marketplace may be classified as a large merchant, while merchants who have an annual revenue less than $100,000 on the online marketplace may be classified as a small merchant. The large merchants and small merchants may be processed by the online marketplace using different models, for example, a large merchant model for processing large merchants and a small merchant model for processing small merchants.

However, sometimes the underlying difference between the large and small merchants may be very small. For example, the difference in annual revenue is only $2 between a "large" merchant that has an annual revenue of $100,001 and a "small" merchant that has an annual revenue of $99,999, and yet these two merchants may be treated very differently based on their respective "large merchant" and "small merchant" designations. For example, certain benefits (e.g., waived or reduced fees) or predefined policies (e.g., preapproval for certain credit applications or loans) may be available to the "large" merchant because it is processed by the large merchant model, while these benefits or predefined policies may not be available to the "small" merchant because it is processed by the small merchant model, or vice versa. Such a rigid segmentation between the large merchants and small merchants is not only inefficient and/or inaccurate, but it can also raise questions of unfairness, especially when the rationale for the segmentations is not transparent to the public, and the segmentation results and consequences may appear arbitrary, or even worse, targeted at a particular subgroup of the population (e.g., more adversely impacting a specific ethnicity, gender, country of origin, etc.).

It is understood that the segmentation between large merchants and small merchants based on annual revenue is merely a non-limiting example of the many different types of entity attributes for which a hardline threshold may be utilized for segmentation. Other non-limiting examples of entity attributes that could have a hardline threshold may include age (e.g., older or younger than a predefined age), experience (e.g., operating at a certain capacity for longer or shorter than a predefined amount of time), credit score (e.g., greater than or less than a predefined score), income (e.g., greater than or less than a predefined number), number of social media followers (e.g., greater than or less than a predefined number), etc. Regardless of the specific type of entity attribute, however, the end result is that the rigid segmentation based on the hardline thresholds may lead to problems and/or inefficiencies.

To address the problems discussed above, the present disclosure softens a hardline threshold, such that the processing of an entity involves contributions or involvements from multiple models, rather than just one. In other words, whereas the hardline thresholds lead to data and/or transactions associated with an entity being processed exclusively using one model (which could be inefficient and/or appear unfair), the softening of the hardline thresholds allows data and/or transactions associated with the entity to be processed using two or more models, where each model has a respective contribution to the end processing result. As such, the processing of an entity according to the softened thresholds may more accurately reflect the underlying characteristic of the entity, and the end result is less arbitrary, more accurate, and fairer. The various aspects of the present disclosure are discussed in more detail with reference to FIGS. 1-10.

FIG. 1 is a block diagram illustrating a first schema 20 with a hardline threshold 30. The schema 20 may be a conventional schema that is originally implemented or deployed in an electronic system of a service provider, for example, a payment provider, a social network platform, an insurance carrier, an online marketplace, a content streaming service, etc. The schema 20 allows the service provider to segment or classify their users or other entities operating on, or otherwise associated with, their electronic system. As shown in FIG. 1, the hardline threshold 30 is a question of whether a merchant (or another suitable entity) has a yearly revenue greater than $100K. If the answer is false—meaning that the merchant has a yearly income of less than or equal to $100K—then the merchant will be labeled as a small merchant, and a model for small merchants will be used to process data and/or transactions associated with the merchant. For example, the model for small merchants may calculate results, provide incentives, charge fees, stipulate guidelines, enact policies, or otherwise make decisions for the merchant based on its classification as a small merchant. On the other hand, if the answer is yes—meaning that the merchant has a yearly income of greater than $100K—then the merchant will be labeled as a large merchant, and a model for large merchants will be used to process data and/or transactions associated with the merchant. For example, the model for large merchants may calculate results, provide incentives, charge fees, stipulate guidelines, enact policies, or otherwise make decisions for the merchant based on its classification as a large merchant. In this manner, all merchants may be segmented into one of two categories based on a single hardline threshold.

However, as discussed above, such a rigid segmentation based on a hardline threshold such as the threshold 30 is suboptimal for a variety of reasons, including inefficiencies, inaccuracies, or perceived and/or actual unfairness. For example, a first merchant having a yearly revenue of $100.01K and a second merchant having a yearly revenue of $99.99K should not be treated as differently as a third merchant having a yearly revenue of $10 million and a second merchant having a yearly revenue of $0.01K, and yet, this is exactly what will happen under the conventional schema 20 using the hardline threshold 30.

Figure 2:
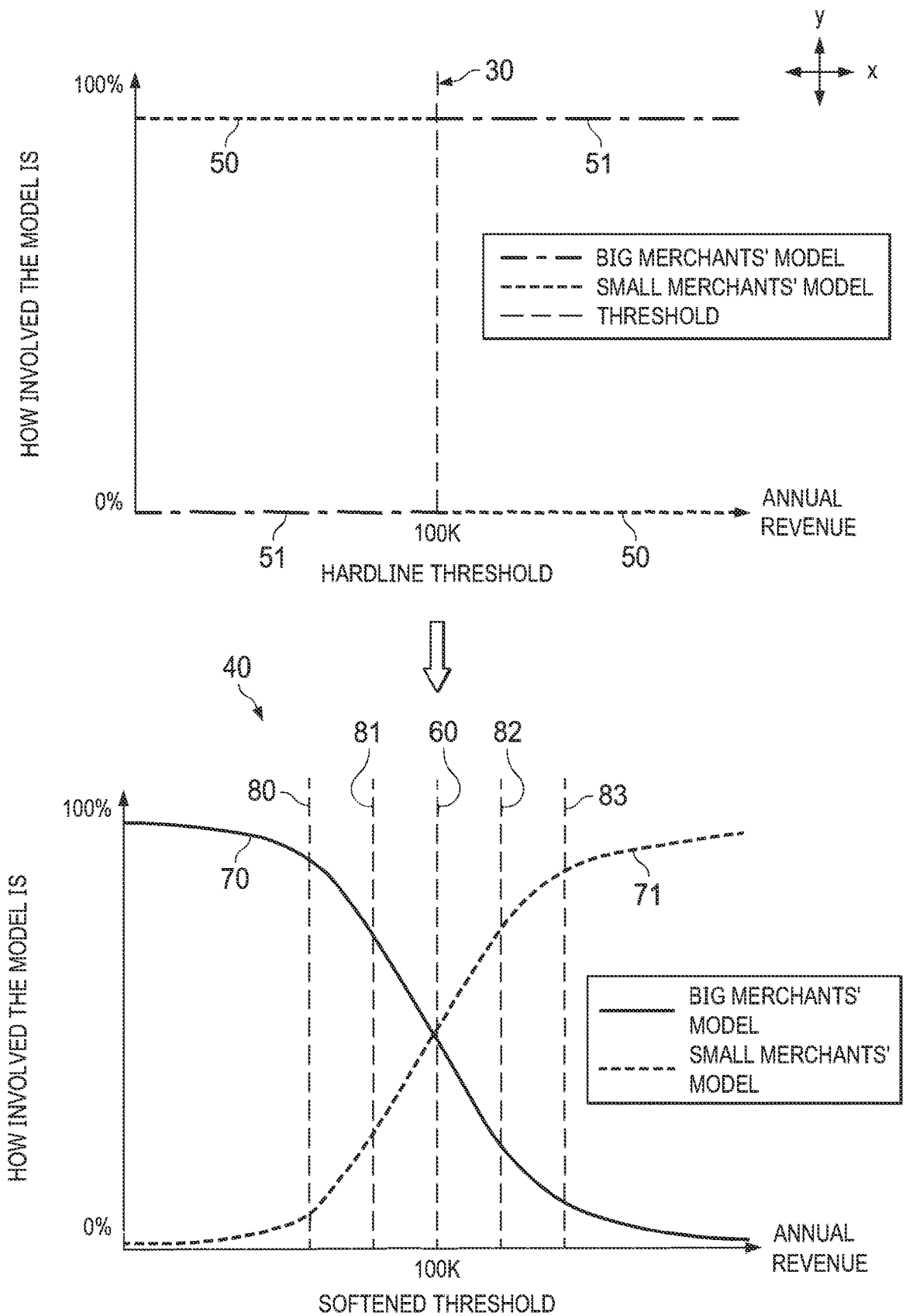
FIG. 2 is a block diagram illustrating a process of softening a hardline threshold according to various aspects of the present disclosure.

To overcome this problem, the present disclosure generates a new schema by softening the hardline thresholds (such as the hardline threshold 30) in the conventional schemas (such as the schema 20). For example, FIG. 2 illustrates an example process of how the hardline threshold 30 of FIG. 1 is transformed into a softened or smoothened threshold 40. The hardline threshold 30 and the softened threshold 40 are each visually illustrated via a two-dimensional plot in FIG. 2, with an X-axis that represents the annual revenue, and a Y-axis that represents a model involvement (also referred to as model contribution). Model involvement refers to the amount or percentage of contribution that a particular model has on the processing of data and/or transactions associated with an entity (in this case, the merchant) depending on where the entity falls with respect to the threshold.

In the case of the schema 20 with the hardline threshold 30, the model involvement is either 100% or 0%. That is, if the merchant's annual revenue falls below the hardline threshold 30, it will be processed exclusively (e.g., 100%) by the small merchant model and not by the big merchant model (e.g., 0%). Conversely, if the merchant's annual revenue exceeds the hardline threshold 30, it will be processed exclusively (e.g., 100%) by the big merchant model and not by the mall merchant model (e.g., 0%). For the conventional schema 20 using the hardline threshold 30, the percentage attributed to the small merchant model (e.g., the small merchant model involvement) is visually represented by lines 50, and the percentage attributed to the big merchant model (e.g., the big merchant model involvement) is visually represented by lines 51. As shown in FIG. 2, there is a discontinuity between the lines 50 at the hardline threshold 30, and the same is true for the lines 51.

According to embodiments of the present disclosure, one manner in which the hardline threshold 30 is transformed into the softened threshold 40 is by distributing the model involvement more granularly or smoothly, rather than the all-or-nothing approach of the conventional schema 20. The softened threshold 40 still has a center 60, which may correspond to the value of the hardline threshold 30. In this simplified example, the center 60 is an annual revenue of $100K, as was the hardline threshold 30. However, at most points on the X-axis left and right of the center 60 (e.g., below and above $100K), the big merchant model and the small merchant model still both contribute to the processing of the merchant, though at different percentages. Under the new schema with the softened threshold 40, the percentage attributed to the small merchant model (e.g., the small merchant model involvement) is visually represented by a curve 70, and percentage attributed to the big merchant model (e.g., the big merchant model involvement) is visually represented by a curve 71.

Suppose that the small merchant model and the big merchant model are each configured to forecast, as their output, the growth percentage for a merchant for the next year. The small merchant model may use different mathematical formulas or algorithms than the big merchant model to forecast the growth percentage. Under the conventional schema 20 with the hardline 30, any merchant having a revenue smaller than $100K would be classified as a small merchant, and its growth percentage will be forecast 100% using the small merchant model, and similarly, any merchant having a revenue greater than $100K would be classified as a big merchant, and its growth percentage will be forecast 100% using the big merchant model.

In contrast, under the new schema with the softened threshold, each merchant corresponding to a different point on the X-axis (e.g., having a particular annual revenue) will have its growth percentage calculated using both the small merchant model and the big merchant model. For example, four different merchants that have respective annual revenues of $60K, $80K, $120K, and $140K are represented by lines 80, 81, 82, and 83, respectively. In this case, the merchant with the annual revenue of $60K may have a contribution or involvement of 90% from the small merchant model and a contribution or involvement of 10% from the big merchant model, based on where the line 80 intersects with the curves 70 and 71. Similarly, the merchant with the annual revenue of $80K may have a contribution or involvement of 70% from the small merchant model and a contribution or involvement of 30% from the big merchant model, the merchant with the annual revenue of $120K may have a contribution or involvement of 30% from the small merchant model and a contribution or involvement of 70% from the big merchant model, and the merchant with the annual revenue of $140K may have a contribution or involvement of 10% from the small merchant model and a contribution or involvement of 90% from the big merchant model.

Suppose that a small merchant model would have forecast a growth percentage of 30%, and a big merchant model would have forecast a growth percentage of 20%, then these four merchants would have their growth percentages forecast as:

29% (30%*0.9+20%*0.1=29%),
26% (30%*0.7+20%*0.3=26%),
23% (30%*0.3+20%*0.7=23%), and
21% (30%*0.1+20%*0.9=21%), respectively. In contrast to the conventional schema 20 where these four merchants would have been forecast to have growth percentages of 30%, 30%, 20%, and 20% based on where they fall with respect to the hardline threshold 30, the new schema with the softened threshold 40 is able to more accurately calculate the growth percentages of these four merchants based on a weighted model involvement, which better reflects the true underlying condition or characteristic of the merchants.

Figure 3:
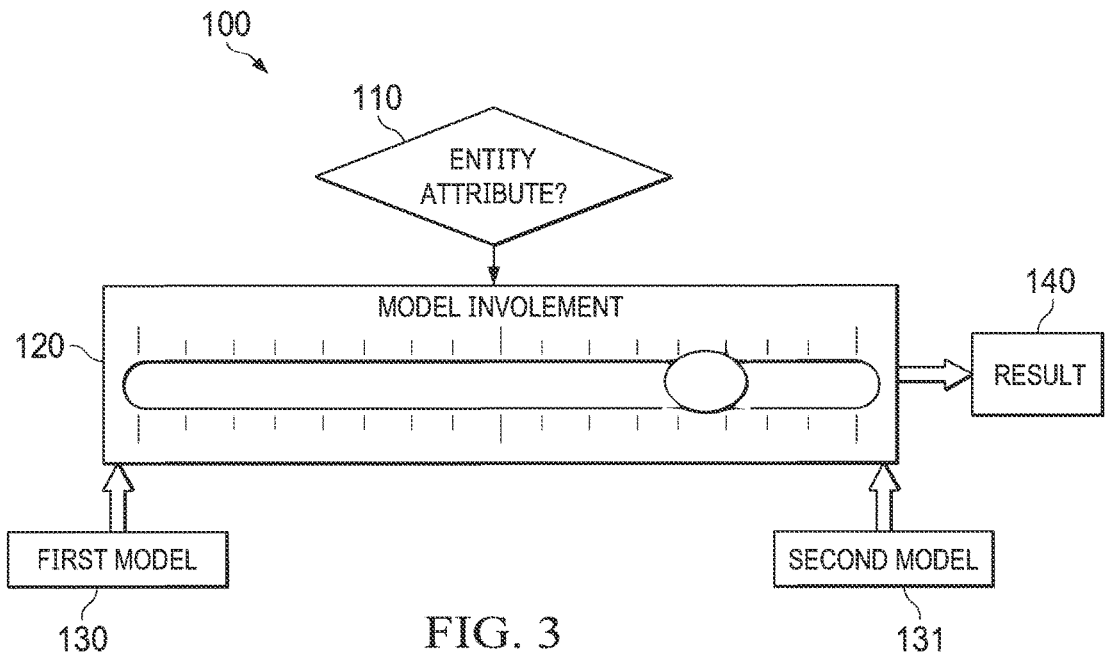
FIG. 3 is a block diagram illustrating a model involvement according to various aspects of the present disclosure.

FIG. 3 is a block diagram illustrating an example new schema 100 generated based on a process similar to the process discussed above with reference to FIG. 2. According to the new schema 100, an entity's attribute 110 is determined. In various embodiments, the entity may be a merchant, a user, or another suitable participant of an electronic system or network. Non-limiting examples of the entity attribute 110 may include the entity's age, size, experience, credit score, income, revenue, growth, market share, social media influence (e.g., number of followers or views of content generated), etc. In many, if not all, of the cases, the entity attribute 110 for a specific entity may have a quantifiable value. For example, a merchant (as the underlying entity) may have an annual revenue (as the entity attribute) that is quantifiable (e.g., $101K). In any case, the schema 100 determines the value of the entity attribute 110.

The schema 100 then determines a model involvement 120 based on the determined value of the entity attribute 110. The model involvement 120 may function similar to a sliding scale in some embodiments. For example, when the value of the entity attribute is small, the model involvement 120 mostly applies a first model 130 that is customized for entities having low values for the attribute (e.g., small merchant model for merchants with lower annual revenue than $100K), and not much of a second model 131 that is customized for entities having high values for the attribute (e.g., big merchant model for merchants with greater annual revenue than $100K). As the value of the entity attribute increases, the model involvement 120 gradually begins to apply more of the second model 131, and less of the first model. In this manner, the model involvement 120 corresponds to, or otherwise reflects, the softened threshold 40 discussed above with reference to FIG. 2.

The schema 100 then generates a result 140 based on the model involvement 120. Again, as discussed above with FIG. 2, the result 140 may be calculated based on weighted contributions from both the first model and the second model. Note that the result 140 may pertain to another characteristic associated with the entity that is completely different from the entity attribute. For example, the entity attribute 110 may be the annual revenue of a merchant, whereas the result 140 may be a forecast growth percentage for the merchant.

It is also understood that an electronic system may generate a plurality of different schemas similar to the schema 100, where each schema is associated with a different type of result and/or a different entity attribute. For example, an electronic system may generate another schema, where the entity attribute is still the merchant annual revenue, but the end result is amount of fees to be charged from the merchant. In that case, a first model may still be a small merchant model that contains algorithms and/or formulas for charging an appropriate fee for small merchants, and a second model may still be a big merchant model that contains algorithms and/or formulas for charging an appropriate fee for big merchants, and the end result is calculated with a sliding scale of contributions from both the first model and the second model, depending on where the entity's attribute value falls.

As another example, an electronic system may generate yet another schema, where an entity may be a user of an online content streaming provider, and the entity attribute may be the number of hours of online streaming content watched by the user. In that example, the first model may be a model customized for casual viewers who do not consume much online streaming content, and the second model may be customized for avid viewers who consume a heavy load of online streaming content (e.g., often binge watches online streaming content). The end result 140 may be the type and/or number of ads to be sent to the user, the type and/or number of online streaming content recommendations to be sent to the user, or pricing for the online streaming content, etc.

Other non-limiting example schemas may involve:
Users of a social media network, whose entity attribute is the number of followers or views each user has, and the end result to be determined by the model involvement is the pricing mechanism/structure for the social media user;
Members who obtain medical coverage from a medical insurance company, who entity attribute is the age of the member, and the end result to be determined by the model involvement is the pricing structure for insuring the member;
Members who obtain car insurance from a car insurance company, who entity attribute is the mileage of the car, and the end result to be determined by the model involvement is the pricing structure for insuring the car.
Merchants of a payment network, whose entity attribute is the total payment volume, and the end result to be determined by the model involvement is a probability that a specific transaction involving the merchant is a bad transaction (e.g., fraudulent).

It is also understood that although it is possible for the model involvement 120 to always use contributions from both a first model and a second model to calculate the end result 140, some embodiments of the present disclosure may skip or bypass one model or the other if the contribution from that model is too small or too large (e.g., below a lower limit or above an upper limit). For example, the model involvement may initially determine that, based on a merchant annual revenue of $100, the contribution of the first model (e.g., for small merchants) is 99.99%, and the contribution of the second model (e.g., for big merchants) is 0.01%. Alternatively, the model involvement may initially determine that, based on a merchant annual revenue of $10 million, the contribution of the first model (e.g., for small merchants) is 0.01%, and the contribution of the second model (e.g., for big merchants) is 99.99%.

In the scenario discussed above, the schema could proceed to calculate the end result 140 based on these heavily skewed (towards the first model or towards the second model) contributions. However, running both models to calculate the end result 140 may be computationally expensive and could lead to a waste of electronic resources, especially if an electronic system is calculating many different results and/or for many different entities simultaneously. Therefore, the schema may apply a filter containing a lower limit of 1% and an upper limit of 99% to the output of the model involvement. If the output of the model involvement indicates that the contribution of either model is less than 1% or greater than 99%, the end result 140 should just be calculated based just on the model whose contribution is greater than the upper limit of 99% while ignoring the model whose contribution is less than the lower limit of 1%. Alternatively stated, the end result is calculated using contributions from both models only if the model involvement specifies that the contributions from either model is within a predefined range (in this case, 1% to 99%). Doing so could improve the functioning of a computer system, as it avoids the unnecessary waste of electronic resources (e.g., computations performed by electronic processors) during the implementation of the present disclosure.

It is also understood that although two models are used in the examples discussed above (e.g., a small merchant model and a big merchant model), the concepts of the present disclosure may apply to three or more models as well. For example, there could be a first model for micro-sized merchants, a second model for small merchants, a third model for medium merchants, a fourth model for large merchants, and fifth model for giant merchants. Regardless of the number of models, the end result (e.g., the result 140) could still be calculated by weighing a contribution simultaneously from each of the merchants, though at different contribution percentages.

Figure 4:
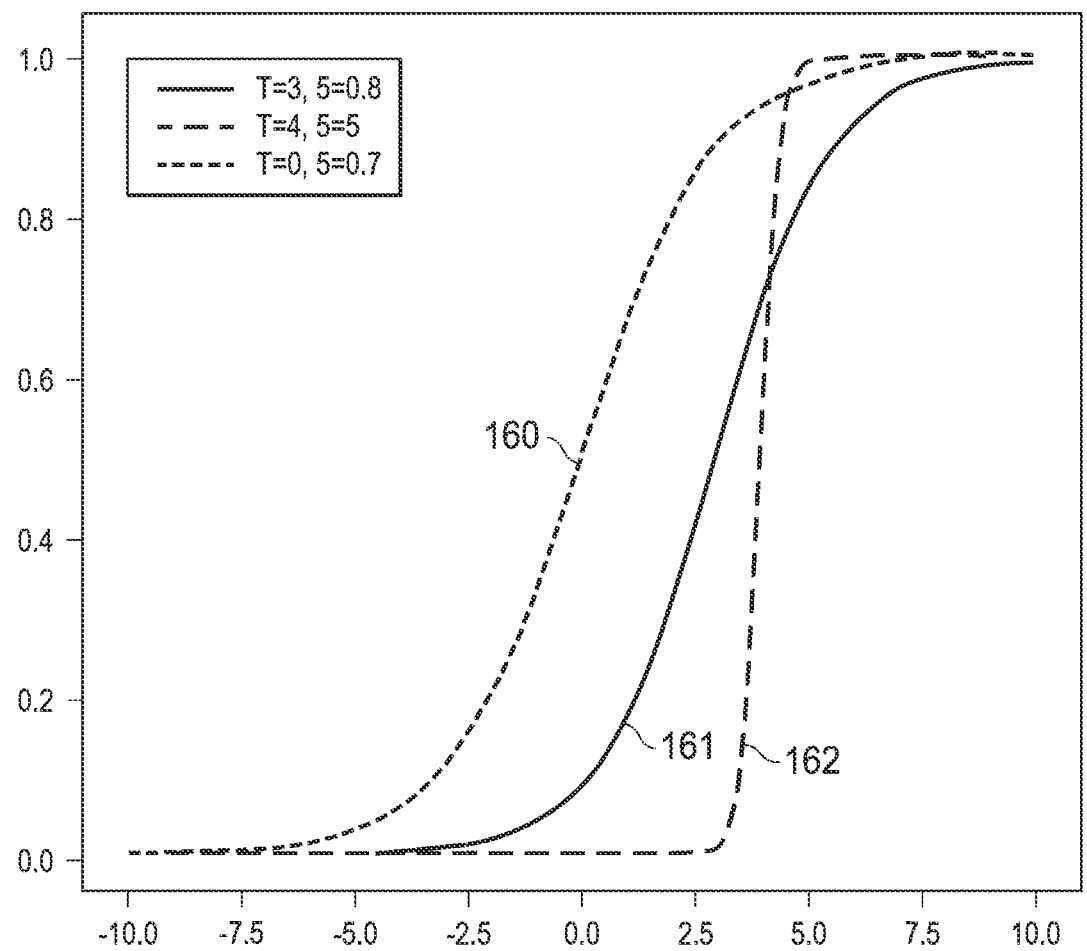
FIG. 4 is a graph illustrating various different smoothened curves that can be generated as a part of threshold softening according to various aspects of the present disclosure.

Referring now to FIG. 4, a graph 150 illustrates various different smoothened curves that can be generated using a sigmoid function as a part of the threshold softening. For example, the graph 150 includes a plurality of curves 160, 161, and 162 that are each plotted over an X-axis and a Y-axis. In some embodiments, the X-axis may represent a normalized value of the entity attribute (e.g., annual revenue), and the Y-axis may represent an amount or percentage of model involvement (between 0 and 1, or 0% and 100%), which is also the output of the sigmoid function. Each of the curves 160-162 may be generated by the sigmoid function as an embodiment of the curve 71 of FIG. 2, or a curve similar to the curve 71. In that regard, the sigmoid function essentially transforms a discontinuous line (such as the line 51 of FIG. 2, representing the model involvement of the big merchant model associated with the hardline threshold 30) into a continuous smooth curve that has a center and a slope. The center is the location on the X-axis where the model involvement from both of the models are at 50%, and the slope represents the steepness of the curve, or how sharp the curve bends.

In FIG. 4, the center is denoted as T, and the slope is denoted as S. The curves 160, 161, and 162 have centers T=0, T=3, and T=4, respectively, and they also have slopes S=0.7, S=0.8, and S=5, respectively. In some embodiments, the optimal slope may be determined using an optimization algorithm, such as a gradient descent algorithm. It is understood that although the sigmoid function is used as an example tool to soften the threshold, other functions may also be used instead, such as a piecewise linear function. The piecewise linear function may generate a plot with piecewise linear components, rather than curves, to represent the model involvement.

The computer programming code for generating the model involvement scores (e.g., using the sigmoid function) and calculating the end result (e.g., the result 140 of FIG. 3) is listed below in a non-limiting embodiment.

S=1 #This is the slope we decided for
T=5 #This is the threshold
a=S
b=−1*T*S
'''

Assuming we predicted to score of both models, so the new_sample has 3 elements:
1. The value we calculate based on it (seniority in PayPal for example), the "k" in the idea document
2. The predict probability of the model A (3 classes, sums to 1), after running model_A.predict_probability
3. The predict probability of the model B (3 classes, sums to 1), after running model_B.predict_probability
'''

```
new_sample = {"splitting_value": 4.2,
  "model_A_scores": np.array([0.3, 0.6, 0.1]), #What modelA says
  "model_B_scores": np.array([0.4, 0.4, 0.2]), #What modelB says
}
```

'''
The probability matrix will return 3×2 matrix. each column represents the probabilities of the two models:
    [0.3, 0.4]
    [0.6, 0.4]
    [0.1, 0.2]
'''

```
probability_matrix = np.c_[new_sample["model_A_scores"],
  new_sample["model_B_scores"]]
model_A_involvement = 1/(1+np.exp(-(a*new_sample["split-
  ting_value"] + b)))
#The sigmoid function
model_B_involvement = 1-model_A_involvement
#concatenating the two involvement scores into a vector.
model_involvements = np.array([model_A_involvement,
  model_B_involvement])
model_output = probability_matrix.dot(model_involvements)
```

The discussions above pertain to a scenario where the softened threshold is used to calculate a numerical value (e.g., the growth percentage) as the end result. Such a task is referred to as a regression task. However, threshold softening may also be applied to a classification task, in which the end result is to produce a categorical value, such as a decision to approve or to not approve a request from an entity (e.g., a request for obtaining a loan), or to assign a probability for each of a plurality of categories or events. In the classification scenario, the softening of the hardline threshold is done in substantially the same manner as in the regression scenario. However, the classification scenario uses a different mechanism when it comes to combining the models. When running a model in a multiclass classification problem, the model returns a likelihood score for each event. One important property of these common kind of models is that the total likelihood scores should sum to one (i.e., sum to 100%). For example, an ordinary output of a 3-class model could be [x, y, z], where the probability for the first class is x, the probability for the second class is y, and the probability for the third class is z, where x, y, and z are fractions or percentages, whose sum is 1 or 100%. One example solution for combining the models is to concatenate the output vectors to form a matrix with the shape n_classes×2, and multiply it (e.g., using a dot product operation) with a vector with the shape of 2, which stands for model involvement.

To illustrate the above with a simple example, suppose that there are two models: model A and model B. Model A and model B are each configured to predict a probability of an outcome in a plurality of categories. In this non-limiting example, model A and model B are each configured to predict the probability that a given merchant is involved in the three following industries: fashion, electronics, and household tools, with the total or sum of the probabilities adding up to 1 (or 100%). Specifically, model A predicts that the probabilities that a given merchant is involved in fashion, electronics, and household tools are 0.3, 0.6, and 0.1, respectively, which could be represented by a one-dimensional matrix of [0.3, 0.6, 0.1]. Model B predicts that the probabilities that a given merchant is involved in fashion, electronics, and household tools are 0.4, 0.4, and 0.2, respectively, which could be represented by a one-dimensional matrix of [0.4, 0.4, 0.2]. Also suppose that based on the given merchant's attribute value (e.g., annual revenue), it has model involvement scores of 0.3 and 0.7 for model A and model B, respectively. In other words, based on where a vertical line representing the merchant's annual revenue intersects the curves 70 and 71 in FIG. 2, it is determined that the model A should contribute 30% to the end result (e.g., predicted probabilities of the merchant being involved in the three industries of fashion, electronics, and household tools), and that the model B should contribute 70% to the end result. The concatenated matrix operation is as follows:

$$\begin{pmatrix} 0.3 & 0.4 \\ 0.6 & 0.4 \\ 0.1 & 0.2 \end{pmatrix} \cdot \begin{pmatrix} 0.3 \\ 0.7 \end{pmatrix} = \begin{pmatrix} 0.37 \\ 0.46 \\ 0.17 \end{pmatrix}$$

Therefore, the end result of the above matrix operation is [0.37, 0.46, and 0.17]. That is, based on the model involvement scores of 0.3 and 0.7 for models A and B, respectively, the predicted probability of this given merchant of being involved in the fashion industry is 0.37 (or 37%), the predicted probability of this given merchant of being involved in the electronics industry is 0.46 (or 46%), and the predicted probability of this given merchant of being involved in the household tools industry is 0.17 (or 17%). As such, rather than just giving a more polarized prediction of [0.3, 0.6, 0.1] (if the merchant is a small merchant) or [0.4, 0.4, 0.2] (if the merchant is a big merchant), the improved schema with the softened threshold of the present disclosure can offer a more finely tuned and more precise prediction for the merchant based on its specific size (which is measured by the annual revenue in this example).

The computer programming code produced above is for performing the regression task. The corresponding computer programming code for performing the classification task (e.g., predicting the probabilities of the merchant being involved in each of three industries) is also listed below in a non-limiting embodiment.

```
S=1 #This is the slope we decided for
T=5 #This is the threshold
a=S
b=-1*T*S
'''
Assuming we predicted to score of both models, so the new_sample has 3 elements:
1. The value we calculate based on it (seniority in PayPal for example), the "k" in the idea document
2. A number representing the prediction of modelA (model_A_score)
3. A number representing the prediction of modelB (model_B_score)
''' new_sample = {"splitting_value": 4.2,
    "model_A_score": 9, #What modelA says, this time a single number
    "model_B_score": 7, #What modelB says, this time a single number
}

'''
The prediction_vector is just concatenating these two numbers together.
''' prediction_vector = np.array([new_sample["model_A_score"],
new_sample["model_B_score"]])
model_A_involvement = 1/(1+np.exp(-(a*new_sample["splitting_value"] + b)))
#The sigmoid function
model_B_involvement = 1-model_A_involvement
#concatenating the two involvement scores into a vector.
model_involvements = np.array([model_A_involvement,
model_B_involvement])
model_output = prediction_vector.dot(model_involvements)
```

The discussions above pertain to one-dimensional segmentations, where the entities are segmented into different segments or classes based on a single type of entity attribute, such as based on the annual revenue as the entity attribute. However, the concepts of the present disclosure may apply to multi-dimensional segmentations as well, where the entities are segmented into different segments or classes based on two or more types of entity attributes. As a non-limiting example, the entities may have two types of entity attributes:

1. a total payment attribute that measures the total number of payments a user of the network has made; and
2. a time-on-file attribute that measures how long a user has been a member of a network.

Figure 5:
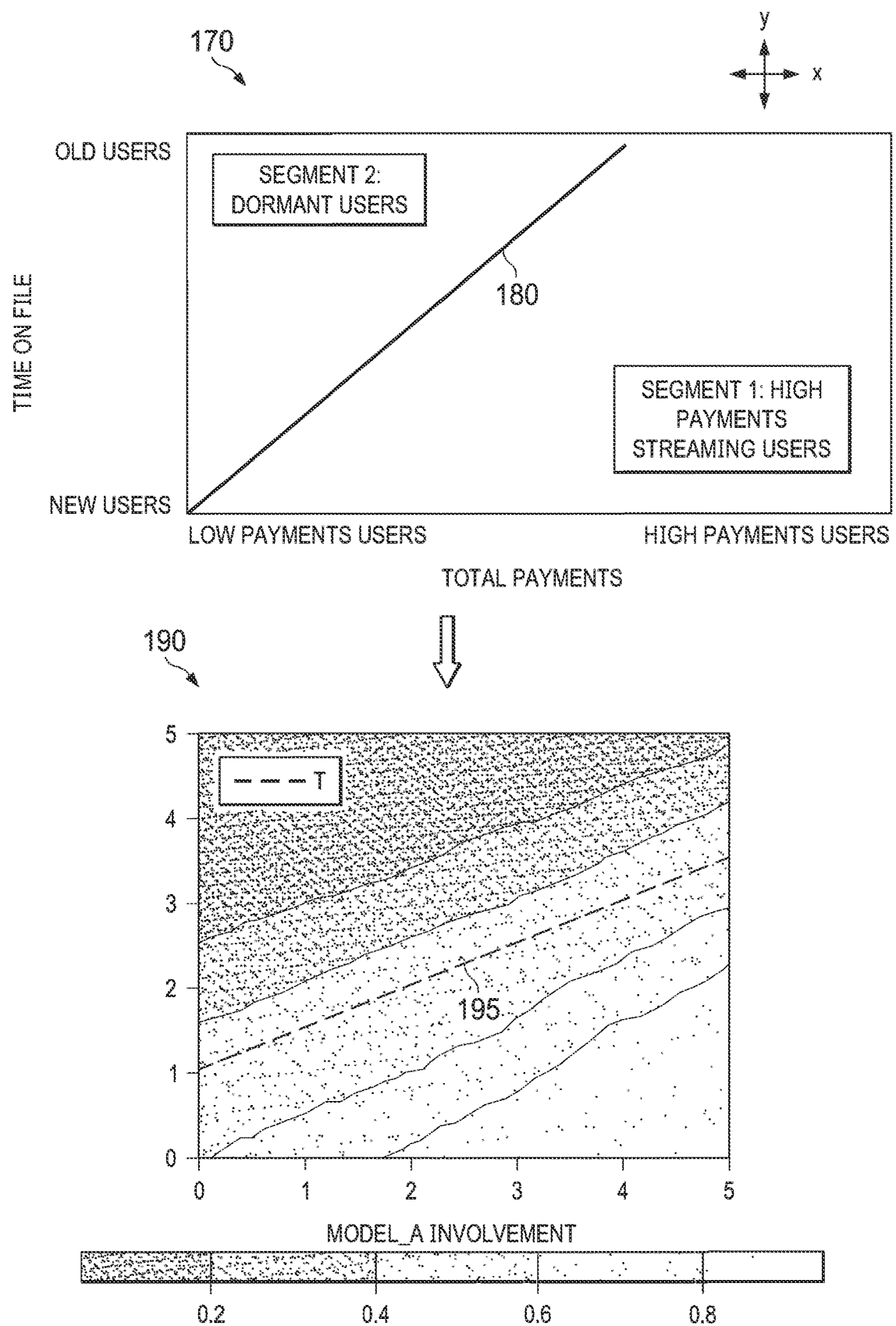
FIG. 5 is a graph illustrating multi-dimensional threshold softening according to various aspects of the present disclosure.

A threshold softening process involving these two-dimensional attributes is illustrated visually in FIG. 5. In more detail, FIG. 5 illustrates a graph 170 that uses a hardline two-dimensional threshold 180, as well as a graph 190 that has softened the hardline two-dimensional threshold 180.

The graphs 170 and 190 both include an X-axis that represents the total payment attribute and a Y-axis that represents the time-on-file attribute. The hardline threshold 180 for a conventional schema divides the users into a segment 1 of high-payment streaming users and a segment 2 of dormant users. As discussed above, such a rigid segmentation may lead to inefficiencies, inaccuracies, or unfairness. As such, the present disclosure softens the hardline threshold 180 in the graph 190, where the dotted line 195 corresponds to the location of the hardline threshold 180, but each point on the graph 190 (e.g., each gradient) may have a corresponding model involvement score for a model A and/or a model B.

For example, the top left region of the graph 190 may have a low model involvement score for model A but a high model involvement score for model B. As the location within the graph 190 moves from the top left toward the bottom right, the model involvement score for model A begins to increase, and the model involvement score for model B begins to decrease. The bottom right region of the graph 190 may have a high model involvement score for model A but a low model involvement score for model B. Depending on a user's specific total payment and time-on-file, the user's corresponding "location" in the graph 190 can be determined, where the location's X-axis component is the user's total payment, and the location's Y-axis component is the user's time-on-file. In this manner, the model involvement scores from both models A and B can be determined for such a user based on the user's two-dimensional attributes. It is understood that the present disclosure is not limited to the segmentation involving just two-dimensional attributes, but three or more dimensional attributes as well.

Figure 6:
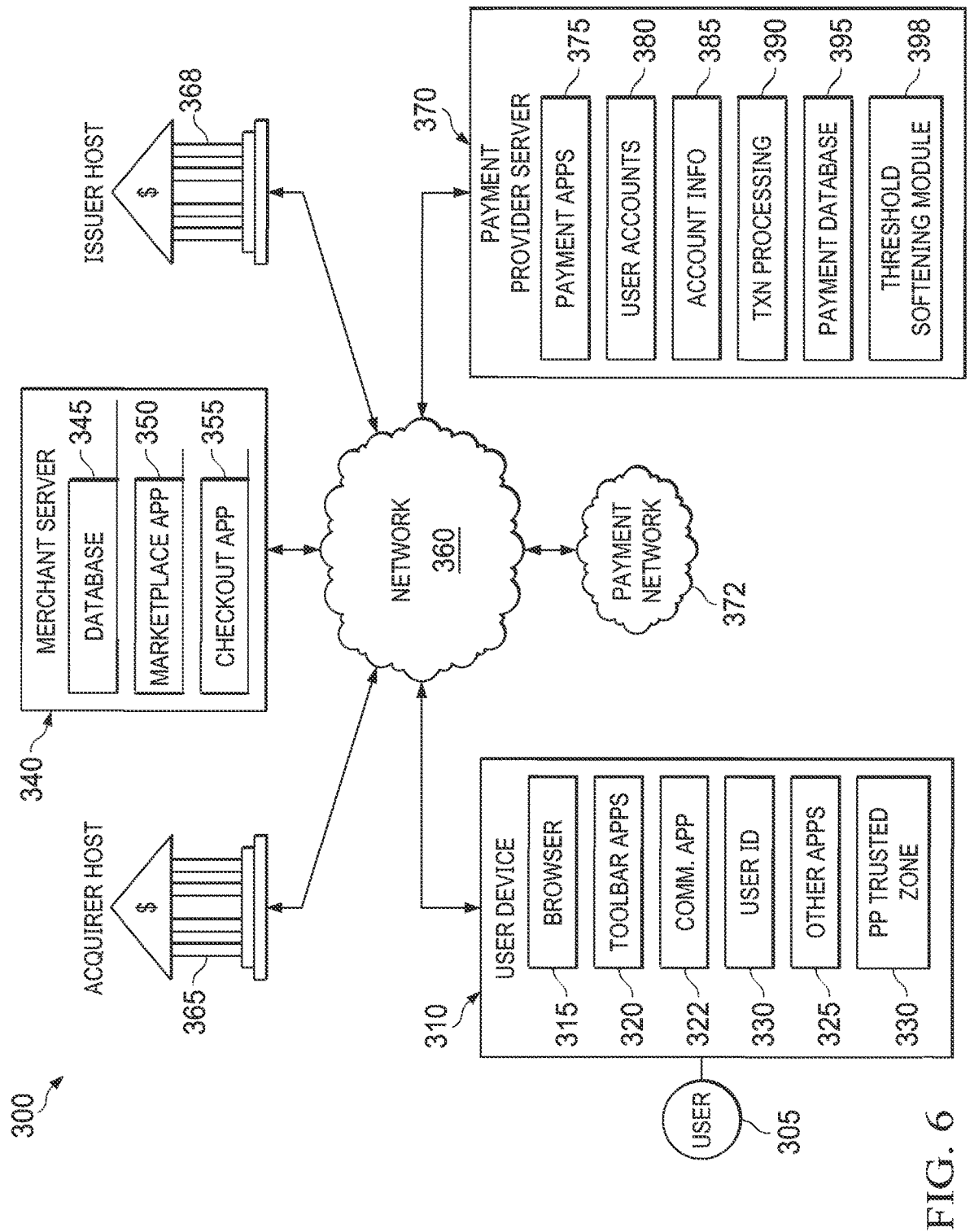
FIG. 6 is a block diagram of a networked system according to various aspects of the present disclosure.

FIG. 6 is a block diagram of a networked system 300 or architecture suitable for conducting electronic online transactions according to an embodiment. It is understood that the hardline threshold softening may be used by one or more entities involved in the networked system 300. The networked system 300 may comprise or implement a plurality of servers and/or software components that operate to perform various payment transactions or processes. Exemplary servers may include, for example, stand-alone and enterprise-class servers operating a server OS such as a MICROSOFT™ OS, a UNIX™ OS, a LINUX™ OS, or other suitable server-based OS. It can be appreciated that the servers illustrated in FIG. 1 may be deployed in other ways and that the operations performed and/or the services provided by such servers may be combined or separated for a given implementation and may be performed by a greater number or fewer number of servers. One or more servers may be operated and/or maintained by the same or different entities.

The system 300 may include a user device 310, a merchant server 340, a payment provider server 370, an acquirer host 365, and an issuer host 368 that are in communication with one another over a network 360. Payment provider server 370 may be maintained by a payment service provider, such as PayPal™, Inc. of San Jose, CA. A user 305, such as a consumer, may utilize user device 310 to perform an electronic transaction using payment provider server 370. For example, user 305 may utilize user device 310 to visit a merchant's web site provided by merchant server 340 or the merchant's brick-and-mortar store to browse for products offered by the merchant. Further, user 305 may utilize user device 310 to initiate a payment transaction, receive a transaction approval request, or reply to the request. Note that transaction, as used herein, refers to any suitable action performed using the user device, including payments, transfer of information, display of information, etc. Although only one merchant server is shown, a plurality of merchant servers may be utilized if the user is purchasing products from multiple merchants.

User device 310, merchant server 340, payment provider server 370, acquirer host 365, and issuer host 368 may each include one or more electronic processors, electronic memories, and other appropriate electronic components for executing instructions such as program code and/or data stored on one or more computer readable mediums to implement the various applications, data, and steps described herein. For example, such instructions may be stored in one or more computer readable media such as memories or data storage devices internal and/or external to various components of system 300, and/or accessible over network 360. Network 360 may be implemented as a single network or a combination of multiple networks. For example, in various embodiments, network 360 may include the Internet or one or more intranets, landline networks, wireless networks, and/or other appropriate types of networks.

User device 310 may be implemented using any appropriate hardware and software configured for wired and/or wireless communication over network 360. For example, in one embodiment, the user device may be implemented as a personal computer (PC), a smart phone, a smart phone with additional hardware such as NFC chips, BLE hardware etc., wearable devices with similar hardware configurations such as a gaming device, a Virtual Reality Headset, or that talk to a smart phone with unique hardware configurations and running appropriate software, laptop computer, and/or other types of computing devices capable of transmitting and/or receiving data, such as an iPad™ from Apple™.

User device 310 may include one or more browser applications 315 which may be used, for example, to provide a convenient interface to permit user 305 to browse information available over network 360. For example, in one embodiment, browser application 315 may be implemented as a web browser configured to view information available over the Internet, such as a user account for online shopping and/or merchant sites for viewing and purchasing goods and services. User device 310 may also include one or more toolbar applications 320 which may be used, for example, to provide client-side processing for performing desired tasks in response to operations selected by user 305. In one embodiment, toolbar application 320 may display a user interface in connection with browser application 315.

User device 310 also may include other applications to perform functions, such as email, texting, voice and IM applications that allow user 305 to send and receive emails, calls, and texts through network 360, as well as applications that enable the user to communicate, transfer information, make payments, and otherwise utilize a digital wallet through the payment provider as discussed herein.

User device 310 may include one or more user identifiers 330 which may be implemented, for example, as operating system registry entries, cookies associated with browser application 315, identifiers associated with hardware of user device 310, or other appropriate identifiers, such as used for payment/user/device authentication. In one embodiment, user identifier 330 may be used by a payment service provider to associate user 305 with a particular account maintained by the payment provider. A communications application 322, with associated interfaces, enables user device 310 to communicate within system 300. User device 310 may also include other applications 325, for example the mobile applications that are downloadable from the App Store™ of APPLE™ or GooglePlay™ of GOOGLE™.

In conjunction with user identifiers 330, user device 310 may also include a secure or trusted zone 335 owned or provisioned by the payment service provider with agreement from device manufacturer. The trusted zone 335 may also be part of a telecommunications provider SIM that is used to store appropriate software by the payment service provider capable of generating secure industry standard payment credentials or other data that may warrant a more secure or separate storage, including various data as described herein.

Still referring to FIG. 1, merchant server 340 may be maintained, for example, by a merchant or seller offering various products and/or services. The merchant may have a physical point-of-sale (POS) store front. The merchant may be a participating merchant who has a merchant account with the payment service provider. Merchant server 340 may be used for POS or online purchases and transactions. Generally, merchant server 340 may be maintained by anyone or any entity that receives money, which includes charities as well as retailers and restaurants. For example, a purchase transaction may be payment or gift to an individual. Merchant server 340 may include a database 345 identifying available products and/or services (e.g., collectively referred to as items) which may be made available for viewing and purchase by user 305. Accordingly, merchant server 340 also may include a marketplace application 350 which may be configured to serve information over network 360 to browser 315 of user device 310. In one embodiment, user 305 may interact with marketplace application 350 through browser applications over network 360 in order to view various products, food items, or services identified in database 345. In some embodiments, the merchant server 340 may also host a website for an online marketplace, where sellers and buyers may engage in purchasing transactions with each other.

Merchant server 340 also may include a checkout application 355 which may be configured to facilitate the purchase by user 305 of goods or services online or at a physical POS or store front. Checkout application 355 may be configured to accept payment information from or on behalf of user 305 through payment provider server 370 over network 360. For example, checkout application 355 may receive and process a payment confirmation from payment provider server 370, as well as transmit transaction information to the payment provider and receive information from the payment provider (e.g., a transaction ID). Checkout application 355 may be configured to receive payment via a plurality of payment methods including cash, credit cards, debit cards, checks, money orders, or the like.

Payment provider server 370 may be maintained, for example, by an online payment service provider which may provide payment between user 305 and the operator of merchant server 340. In this regard, payment provider server 370 may include one or more payment applications 375 which may be configured to interact with user device 310 and/or merchant server 340 over network 360 to facilitate the purchase of goods or services, communicate/display information, and send payments by user 305 of user device 310.

Payment provider server 370 also maintains a plurality of user accounts 380, each of which may include account information 385 associated with consumers, merchants, and funding sources, such as credit card companies. For example, account information 385 may include private financial information of users of devices such as account numbers, passwords, device identifiers, usernames, phone numbers, credit card information, bank information, or other financial information which may be used to facilitate online transactions by user 305. Advantageously, payment application 375 may be configured to interact with merchant server 340 on behalf of user 305 during a transaction with checkout application 355 to track and manage purchases made by users and which and when funding sources are used.

A transaction processing application 390, which may be part of payment application 375 or separate, may be configured to receive information from a user device and/or merchant server 340 for processing and storage in a payment database 395. Transaction processing application 390 may include one or more applications to process information from user 305 for processing an order and payment using various selected funding instruments, as described herein. As such, transaction processing application 390 may store details of an order from individual users, including funding source used, credit options available, etc. Payment application 375 may be further configured to determine the existence of and to manage accounts for user 305, as well as create new accounts if necessary.

According to various aspects of the present disclosure, a threshold softening module 398 may also be implemented on or accessible by the payment provider server 370. The threshold softening module 398 may include one or more software applications or software programs that can be automatically executed (e.g., without needing explicit instructions from a human user) to perform certain tasks. For example, the threshold softening module 398 may electronically access one or more electronic databases (e.g., the database 395 of the payment provider server 370 or the database 345 of the merchant server 340) to access or retrieve or other determine existing hardline thresholds. The threshold softening module 398 may then transform the hardline thresholds into softened threshold in accordance with the discussions above with reference to FIGS. 1-5.

Based on the above, the threshold softening module 398 can automate decision-making processes such as whether to approve or deny a request from a user, or to predict probabilities of various outcomes, or an amount of fees to charge a merchant or incentives to provide for a merchant, etc. Using softened thresholds where the contributions from multiple models are simultaneously taken into account when these decisions are automatically made, the end result is that the outcomes produced by the threshold softening module 398 are more accurate, more efficient, and fairer. As such, the threshold softening module could reduce the resubmission of requests that would not have been processed correctly under conventional systems. This not only helps conserve electronic resources, but it also reduces unnecessary network traffic, thereby freeing up network communication bandwidth. In addition, the threshold softening module 398 reduces the unnecessary data entry and/or electronic processing that would otherwise be wasted on inaccurately or inefficiently submitting/processing requests under the conventional scheme. As such, the threshold softening module 398 transforms a generic computer into a special machine capable of performing specific predefined tasks: identifying hardline thresholds that could or should be transformed into softened thresholds to more accurately process an entity's request or evaluate an entity's outcome or position. Accordingly, the present disclosure offers an improvement in computer technology.

It is noted that although the threshold softening module 398 is illustrated as being separate from the transaction processing application 390 in the embodiment shown in FIG. 6, the transaction processing application 390 may implement some, or all, of the functionalities of the threshold softening module 398 in other embodiments. In other words, the threshold softening module 398 may be integrated within the transaction processing application 390 in some embodiments. In addition, it is understood that the threshold softening module 398 (or another similar program) may be implemented on the merchant server 340, on a server of any other entity operating a social interaction platform, or even on a portable electronic device similar to the user device 310 (but may belong to an entity operating the payment provider server 370) as well. It is also understood that the threshold softening module 398 may include one or more sub-modules that are configured to perform specific tasks.

Still referring to FIG. 6, a payment network 372 may be operated by payment card service providers or card associations, such as DISCOVER™, VISA™, MASTERCARD™, AMERICAN EXPRESS™, RUPAY™, CHINA UNION PAY™, etc. The payment card service providers may provide services, standards, rules, and/or policies for issuing various payment cards. The payment network 372 interfaces with the acquirer host 365, the issuer host 368, and/or the payment provider 370 server to facilitate transactions, according to various embodiments. For example, the payment provider server 370 may forward a transaction request to the payment network 372. The payment network 372 may assess the transaction and may then send it to the acquirer host 365 or the issuer host 368 as a part of processing the transaction request. However, in some situations, a payment processor (e.g., the entity operating the payment provider server 370) may be penalized by the payment network 372 if the payment processor sends an excess number of transactions that could have been determined by the payment processor to be fraudulent. As such, the payment processor may need to carefully screen the transactions in order to avoid the penalties. Since screening transactions may increase transaction latency, the payment processor is configured to screen some transactions with more scrutiny and other transactions with less scrutiny, according to some embodiments of the present disclosure. A network of communication devices, servers, and the like also may be established to relay payment related information among the different parties of a payment transaction.

Acquirer host 365 may be a server operated by an acquiring bank. An acquiring bank is a financial institution that accepts payments on behalf of merchants. For example, a merchant may establish an account at an acquiring bank to receive payments made via various payment cards. When a user presents a payment card as payment to the merchant, the merchant may submit the transaction to the acquiring bank. The acquiring bank may verify the payment card number, the transaction type and the amount with the issuing bank and reserve that amount of the user's credit limit for the merchant. An authorization will generate an approval code, which the merchant stores with the transaction.

Issuer host 368 may be a server operated by an issuing bank or issuing organization of payment cards. The issuing banks may enter into agreements with various merchants to accept payments made using the payment cards. The issuing bank may issue a payment card to a user after a card account has been established by the user at the issuing bank. The user then may use the payment card to make payments at or with various merchants who agreed to accept the payment card.

Figure 7:
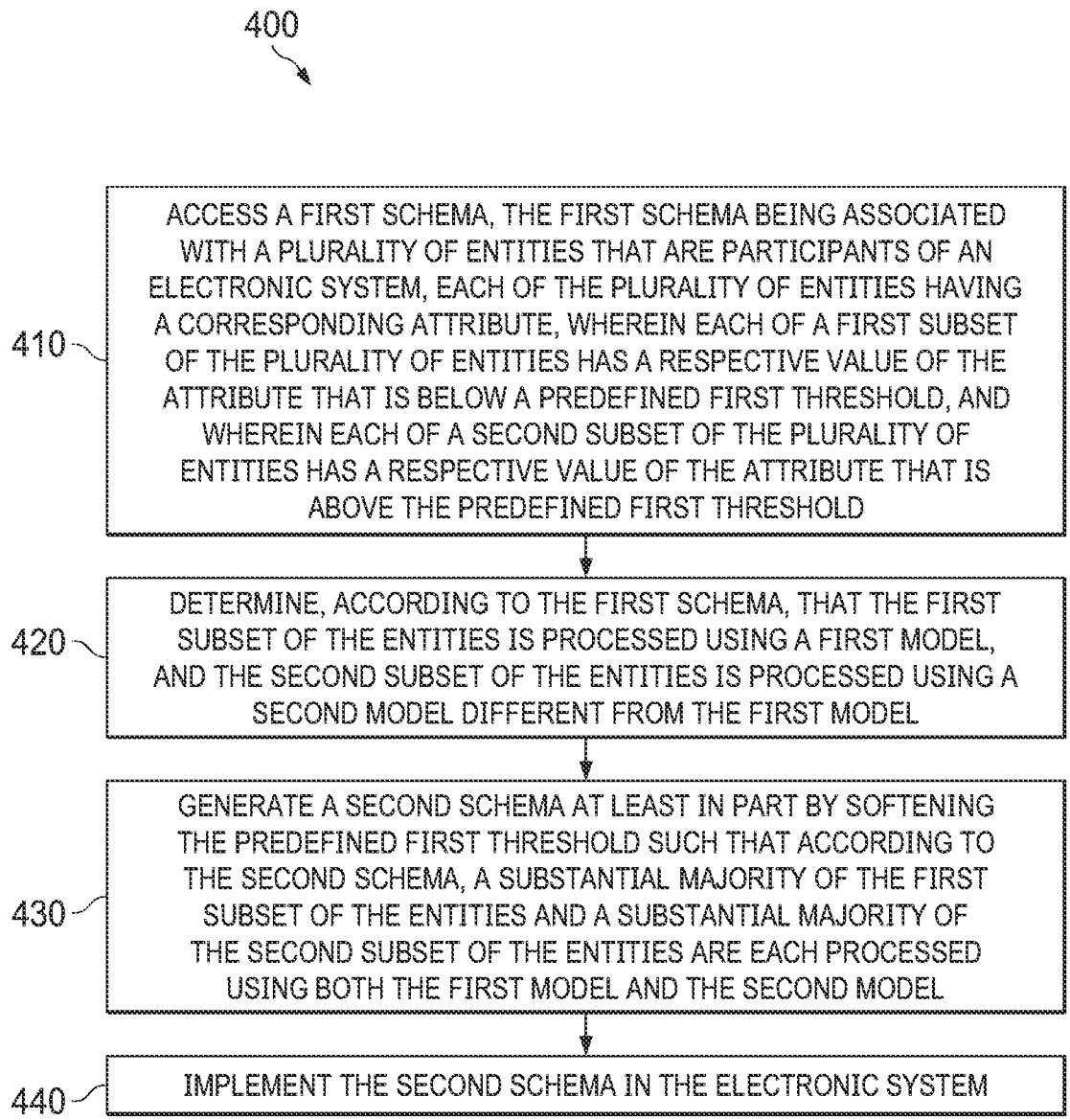
FIG. 7 is a flowchart illustrating a method of threshold softening according to various aspects of the present disclosure.

FIG. 7 is a flowchart illustrating a method 400 for performing threshold softening process according to various aspects of the present disclosure. The various steps of the method 400, which are described in greater detail above, may be performed by one or more electronic processors. In some embodiments, at least some of the steps of the method 400 may be performed by the threshold softening module 398 discussed above.

The method 400 includes a step 410 to access a first schema. The first schema is associated with a plurality of entities that are participants of an electronic system. Each of the plurality of entities has a corresponding attribute. Each of a first subset of the plurality of entities has a respective value of the attribute that is below a predefined first threshold. Each of a second subset of the plurality of entities has a respective value of the attribute that is above the predefined first threshold.

The method 400 includes a step 420 to determine, according to the first schema, that data and/or transactions associated with the first subset of the entities are processed using a first model, and data and/or transactions associated with the second subset of the entities are processed using a second model different from the first model.

The method 400 includes a step 430 to generate a second schema at least in part by softening the predefined first threshold such that according to the second schema, data and/or transactions associated with a predetermined majority of the first subset of the entities and data and/or transactions associated with a predetermined majority of the second subset of the entities are each processed using both the first model and the second model.

The method 400 includes a step 440 to implement the second schema in the electronic system.

In some embodiments, the first schema is implemented in the electronic system before generating the second schema. In some embodiments, the implementing the second schema comprises replacing the first schema in the electronic system with the second schema.

In some embodiments, the electronic system comprises an electronic commerce platform, an electronic social media network, a digital streaming service, or a healthcare marketplace.

In some embodiments, the softening is performed at least in part based on a sigmoid function.

In some embodiments, the softening the predefined first threshold comprises generating a curve that approximates the first predefined threshold. In some embodiments, the softening the predefined first threshold further comprises calculating an optimal slope of the curve using an optimization algorithm.

In some embodiments, the softening the predefined first threshold comprises generating a plurality of progressive thresholds that each have a corresponding first model involvement score and a corresponding second model involvement score. In some embodiments, the first model involvement score indicates a weight of the first model under the second schema, and the second model involvement score indicates a weight of the second model under the second schema. In some embodiments, the predefined first threshold is greater than a first subset of the progressive thresholds and less than a second subset of the progressive thresholds.

In some embodiments, the generating the second schema further comprises: determining that, for the progressive thresholds below a first progressive threshold, the first model involvement score is negligible compared to the second model involvement score; and determining that, for the progressive thresholds above a second progressive threshold, the second model involvement score is negligible compared to the first model involvement score. In some embodiments, according to the second schema, only entities whose corresponding value of the attribute is between the first progressive threshold and the second progressive threshold are processed using both the first model and the second model.

In some embodiments, the attribute comprises a multi-dimensional attribute based on at least two different variables.

In some embodiments, the determining comprises determining, according to the first schema, that data and/or transactions associated with the first subset of the entities are processed exclusively using the first model, and data and/or transactions associated with the second subset of the entities are processed using exclusively the second model.

It is understood that additional method steps may be performed before, during, or after the steps 410-440 discussed above. For example, the method 400 may include a step to evaluate, in response to implementing the second schema, an entity of the plurality of the entities based on the second schema. The evaluating the entity further comprises predicting a performance of the entity or deciding to approve or deny a request from the entity.

Figure 8:
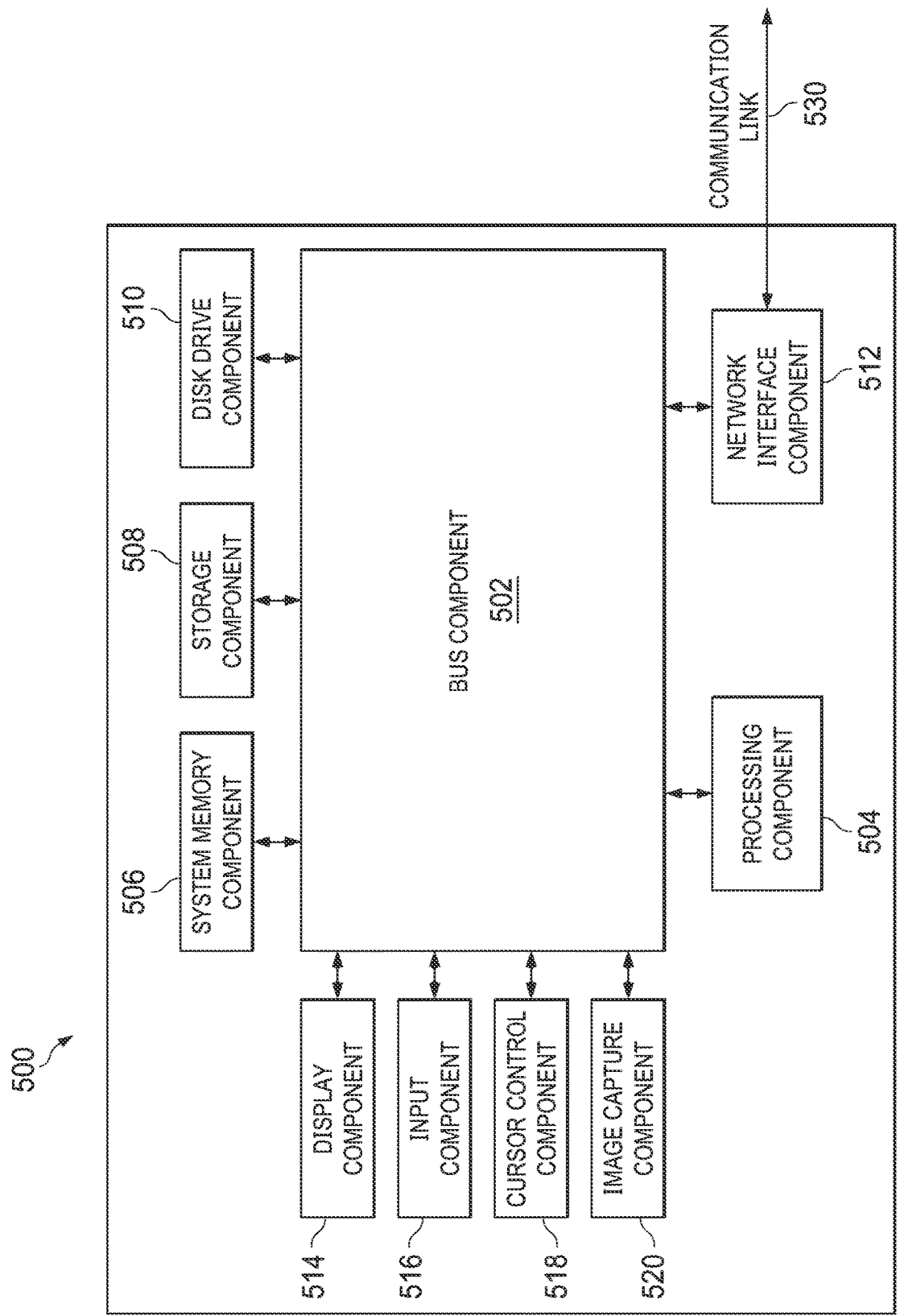
FIG. 8 is an example computer system according to various aspects of the present disclosure.

FIG. 8 is a block diagram of a computer system 500 suitable for implementing various methods and devices described herein, for example, the threshold softening module 398, the user device 310, the merchant server 340, or the payment provider server 370. In various implementations, the devices capable of performing the steps may comprise a network communications device (e.g., mobile cellular phone, laptop, personal computer, tablet, etc.), a network computing device (e.g., a network server, a computer processor, an electronic communications interface, etc.), or another suitable device. Accordingly, it should be appreciated that the devices capable of implementing the threshold softening module 398 and the various method steps of the method 400 discussed below (or the user device 310, the merchant server 340, or the payment provider server 370) may be implemented as the computer system 500 in a manner as follows.

In accordance with various embodiments of the present disclosure, the computer system 500, such as a network server or a mobile communications device, includes a bus component 502 or other communication mechanisms for communicating information, which interconnects subsystems and components, such as a computer processing component 504 (e.g., processor, micro-controller, digital signal processor (DSP), etc.), system memory component 506 (e.g., RAM), static storage component 508 (e.g., ROM), disk drive component 510 (e.g., magnetic or optical), network interface component 512 (e.g., modem or Ethernet card), display component 514 (e.g., cathode ray tube (CRT) or liquid crystal display (LCD)), input component 516 (e.g., keyboard), cursor control component 518 (e.g., mouse or trackball), and image capture component 520 (e.g., analog or digital camera). In one implementation, disk drive component 510 may comprise a database having one or more disk drive components.

In accordance with embodiments of the present disclosure, computer system 500 performs specific operations by the processor 504 executing one or more sequences of one or more instructions contained in system memory component 506. Such instructions may be read into system memory component 506 from another computer readable medium, such as static storage component 508 or disk drive component 510. In other embodiments, hard-wired circuitry may be used in place of (or in combination with) software instructions to implement the present disclosure. In some embodiments, the various components of the threshold softening module 398 may be in the form of software instructions that can be executed by the processor 504 to automatically perform context-appropriate tasks on behalf of a user.

Logic may be encoded in a computer readable medium, which may refer to any medium that participates in providing instructions to the processor 504 for execution. Such a medium may take many forms, including but not limited to, non-volatile media and volatile media. In one embodiment, the computer readable medium is non-transitory. In various implementations, non-volatile media includes optical or magnetic disks, such as disk drive component 510, and volatile media includes dynamic memory, such as system memory component 506. In one aspect, data and information related to execution instructions may be transmitted to computer system 500 via a transmission media, such as in the form of acoustic or light waves, including those generated during radio wave and infrared data communications. In various implementations, transmission media may include coaxial cables, copper wire, and fiber optics, including wires that comprise bus 502.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, carrier wave, or any other medium from which a computer is adapted to read. These computer readable media may also be used to store the programming code for the threshold softening module 398 discussed above.

In various embodiments of the present disclosure, execution of instruction sequences to practice the present disclosure may be performed by computer system 500. In various other embodiments of the present disclosure, a plurality of computer systems 500 coupled by communication link 530 (e.g., a communications network, such as a LAN, WLAN, PTSN, and/or various other wired or wireless networks, including telecommunications, mobile, and cellular phone networks) may perform instruction sequences to practice the present disclosure in coordination with one another.

Computer system 500 may transmit and receive messages, data, information and instructions, including one or more programs (i.e., application code) through communication link 530 and communication interface 512. Received program code may be executed by computer processor 504 as received and/or stored in disk drive component 510 or some other non-volatile storage component for execution. The communication link 530 and/or the communication interface 512 may be used to conduct electronic communications between the threshold softening module 398 and external devices, for example with the user device 310, with the merchant server 340, or with the payment provider server 370, depending on exactly where the threshold softening module 398 is implemented.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as computer program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein. It is understood that at least a portion of the threshold softening module 398 may be implemented as such software code.

It is understood that machine learning may be used to perform various aspects of the present disclosure. For example, machine learning may be used to determine how much to soften a threshold, which may involve the determination of the slope S or the center T discussed above with reference to FIG. 4. In other words, machine learning may be used to optimize the amount or degree of threshold softening.

Figure 9:
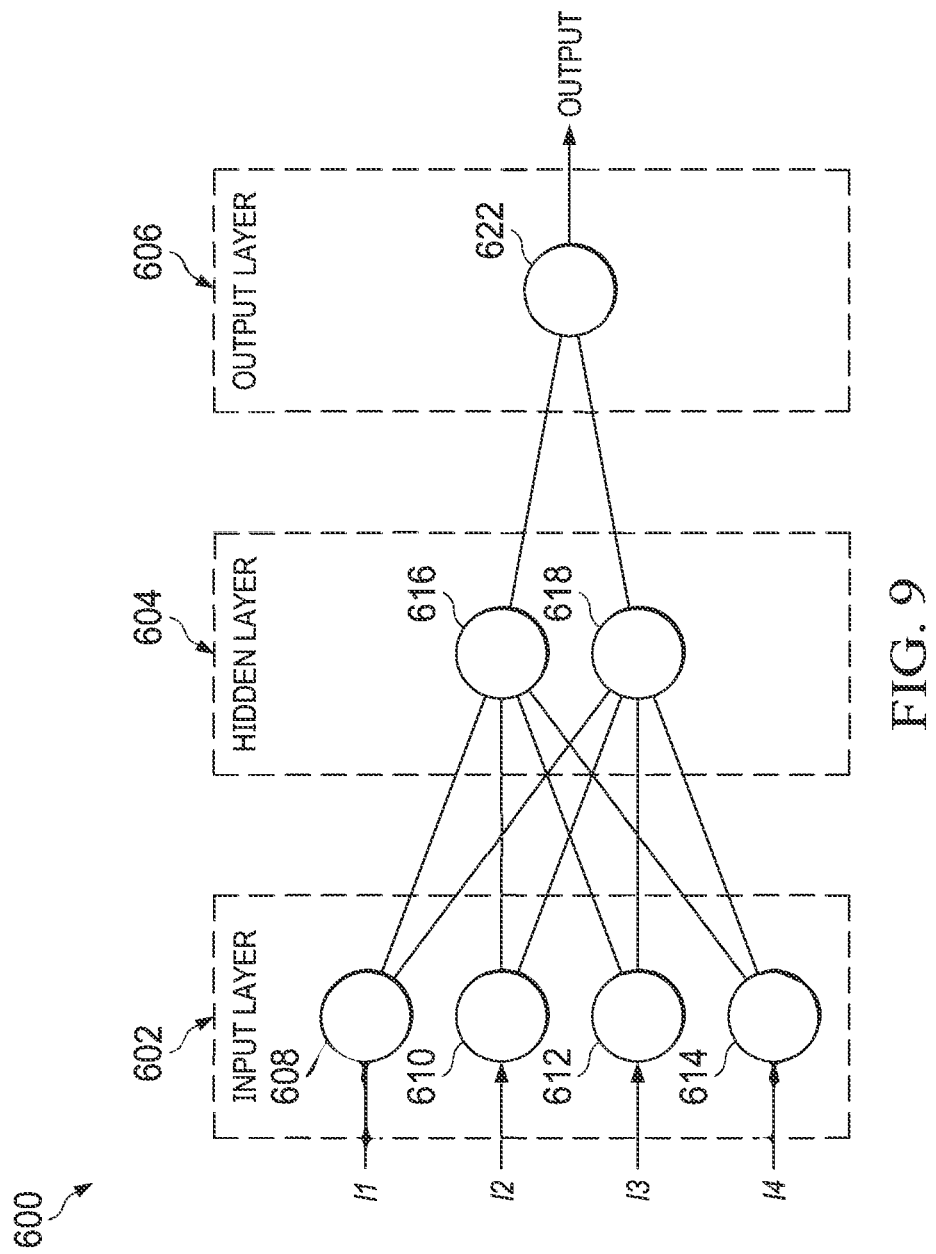
FIG. 9 is a block diagram illustrating a machine learning architecture according to various aspects of the present disclosure.

In some embodiments, the machine learning may be performed at least in part via an artificial neural network, which may be used to implement the threshold softening module 398 of FIG. 6. In that regard, FIG. 9 illustrates an example artificial neural network 600. As shown, the artificial neural network 600 includes three layers — an input layer 602, a hidden layer 604, and an output layer 606. Each of the layers 602, 604, and 606 may include one or more nodes. For example, the input layer 602 includes nodes 608-614, the hidden layer 604 includes nodes 616-618, and the output layer 606 includes a node 622. In this example, each node in a layer is connected to every node in an adjacent layer. For example, the node 608 in the input layer 602 is connected to both of the nodes 616-618 in the hidden layer 604. Similarly, the node 616 in the hidden layer is connected to all of the nodes 608-614 in the input layer 602 and the node 622 in the output layer 606. Although only one hidden layer is shown for the artificial neural network 600, it has been contemplated that the artificial neural network 600 used to implement a machine learning module, and the machine learning module may include as many hidden layers as necessary.

In this example, the artificial neural network 600 receives a set of input values and produces an output value. Each node in the input layer 602 may correspond to a distinct input value. For example, when the artificial neural network 600 is used to implement a machine learning module, each node in the input layer 602 may correspond to a distinct attribute of an entity (e.g., annual revenue).

In some embodiments, each of the nodes 616-618 in the hidden layer 604 generates a representation, which may include a mathematical computation (or algorithm) that produces a value based on the input values received from the nodes 608-614. The mathematical computation may include assigning different weights to each of the data values received from the nodes 608-614. The nodes 616 and 618 may include different algorithms and/or different weights assigned to the data variables from the nodes 608-614 such that each of the nodes 616-618 may produce a different value based on the same input values received from the nodes 608-614. In some embodiments, the weights that are initially assigned to the features (or input values) for each of the nodes 616-618 may be randomly generated (e.g., using a computer randomizer). The values generated by the nodes 616 and 618 may be used by the node 622 in the output layer 606 to produce an output value for the artificial neural network 600. When the artificial neural network 600 is used to implement a machine learning module, the output value produced by the artificial neural network 600 may indicate a likelihood of an event (e.g., a decision to grant or deny an entity's request).

The artificial neural network 600 may be trained by using training data. For example, the training data herein may be the features extracted from historical data of transactions. By providing training data to the artificial neural network 600, the nodes 616-618 in the hidden layer 604 may be trained (adjusted) such that an optimal output (e.g., determining a value for a threshold) is produced in the output layer 606 based on the training data. By continuously providing different sets of training data, and penalizing the artificial neural network 600 when the output of the artificial neural network 600 is incorrect (e.g., when the determined (predicted) likelihood is inconsistent with whether the event actually occurred for the transaction, etc.), the artificial neural network 600 (and specifically, the representations of the nodes in the hidden layer 604) may be trained (adjusted) to improve its performance in data classification. Adjusting the artificial neural network 600 may include adjusting the weights associated with each node in the hidden layer 604.

Although the above discussions pertain to an artificial neural network as an example of machine learning, it is understood that other types of machine learning methods may also be suitable to implement the various aspects of the present disclosure. For example, support vector machines (SVMs) may be used to implement machine learning. SVMs are a set of related supervised learning methods used for classification and regression. A SVM training algorithm— which may be a non-probabilistic binary linear classifier— may build a model that predicts whether a new example falls into one category or another. As another example, Bayesian networks may be used to implement machine learning. A Bayesian network is an acyclic probabilistic graphical model that represents a set of random variables and their conditional independence with a directed acyclic graph (DAG). The Bayesian network could present the probabilistic relationship between one variable and another variable. Other types of machine learning algorithms are not discussed in detail herein for reasons of simplicity.

Figure 10:
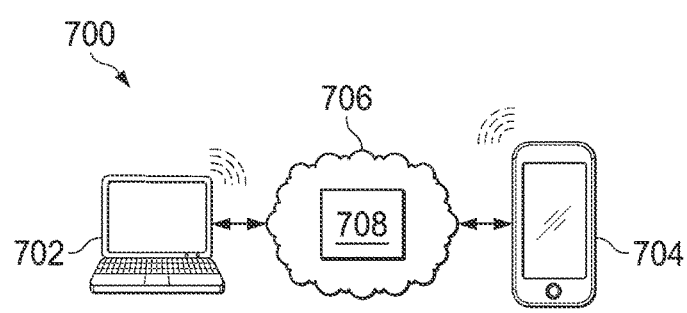
FIG. 10 is a simplified example of a cloud-based computing architecture according to various aspects of the present disclosure.

FIG. 10 illustrates an example cloud-based computing architecture 700, which may also be used to implement various aspects of the present disclosure. The cloud-based computing architecture 700 includes a mobile device 704 (e.g., the user device 310 of FIG. 1) and a computer 702 (e.g., the merchant server 340 or the payment provider server 370), both connected to a computer network 706 (e.g., the Internet or an intranet). In one example, a consumer has the mobile device 704 that is in communication with cloud-based resources 708, which may include one or more computers, such as server computers, with adequate memory resources to handle requests from a variety of users. A given embodiment may divide up the functionality between the mobile device 704 and the cloud-based resources 708 in any appropriate manner. For example, an app on mobile device 704 may perform basic input/output interactions with the user, but a majority of the processing may be performed by the cloud-based resources 708. However, other divisions of responsibility are also possible in various embodiments. In some embodiments, using this cloud architecture, the threshold softening module 398 may reside on the merchant server 340 or the payment provider server 370, but its functionalities can be accessed or utilized by the mobile device 704, or vice versa.

The cloud-based computing architecture 700 also includes the personal computer 702 in communication with the cloud-based resources 708. In one example, a participating merchant or consumer/user may access information from the cloud-based resources 708 by logging on to a merchant account or a user account at computer 702. The system and method for performing the threshold softening process as discussed above may be implemented at least in part based on the cloud-based computing architecture 700.

It is understood that the various components of cloud-based computing architecture 700 are shown as examples only. For instance, a given user may access the cloud-based resources 708 by a number of devices, not all of the devices being mobile devices. Similarly, a merchant or another user may access the cloud-based resources 708 from any number of suitable mobile or non-mobile devices. Furthermore, the cloud-based resources 708 may accommodate many merchants and users in various embodiments.

Based on the above discussions, systems and methods described in the present disclosure offer several significant advantages over conventional methods and systems. It is understood, however, that not all advantages are necessarily discussed in detail herein, different embodiments may offer different advantages, and that no particular advantage is required for all embodiments. One advantage is improved functionality of a computer. For example, the present disclosure softens the hardline thresholds of conventional schemas and takes into account of multiple models simultaneously to generate a result. As such, the end result is more efficient and more accurate, which reduces the waste of resources that would have been associated with conventional schemas with the hardline thresholds. For example, the present disclosure could reduce the waste electronic resources (e.g., data entry, computer processing, or transmission of data packets over a telecommunications network) associated with resubmitting requests that have been inaccurately declined or that need reprocessing. As such, the softened thresholds herein help improve the functionality of a computer.

The inventive ideas of the present disclosure are also integrated into a practical application, for example into the threshold softening module 398 discussed above. Such a practical application can automatically predict the likelihood of a particular scenario (e.g., a merchant's request being approved or denied, or the probability of a merchant being involved in one of a plurality of industries), or automatically calculate a number (e.g., the amount of fees to charge for a user). In addition, such a practical application also helps increase customer satisfaction, since the softened thresholds are less likely to produce perceived bias or unfairness.

It should be appreciated that like reference numerals are used to identify like elements illustrated in one or more of the figures, wherein these labeled figures are for purposes of illustrating embodiments of the present disclosure and not for purposes of limiting the same.

One aspect of the present disclosure involves a method that includes the following steps: accessing a first schema, the first schema being associated with a plurality of entities that are participants of an electronic system, each of the plurality of entities having a corresponding attribute, wherein each of a first subset of the plurality of entities has a respective value of the attribute that is below a predefined threshold, and wherein each of a second subset of the plurality of entities has a respective value of the attribute that is above the predefined threshold; determining, according to the first schema, that data and/or transactions associated with the first subset of the entities are processed using a first model, and data and/or transactions associated with the second subset of the entities are processed using a second model different from the first model; generating a second schema at least in part by softening the predefined threshold such that according to the second schema, data and/or transactions associated with a predetermined majority of the first subset of the entities and data and/or transactions associated with a predetermined majority of the second subset of the entities are each processed using both the first model and the second model; and implementing the second schema in the electronic system.

Another aspect of the present disclosure involves a system that includes a non-transitory memory and one or more hardware processors coupled to the non-transitory memory and configured to read instructions from the non-transitory memory to cause the system to perform operations comprising: receiving a request to generate a result for an entity that is a participant of an electronic system; obtaining a value of an attribute associated with the entity; accessing a model involvement associated with a schema, the model involvement specifying, for a range of values of the attribute, a range of first contribution percentages from a first model usable to generate the result for the entity and a range of second contribution percentages from a second model usable to generate the result for the entity, the second model being different from the first model; determining, based on the obtained value of the entity attribute and the accessing of the model involvement, that the result for the entity should be generated using a first contribution percentage from the first model and a second contribution percentage from the second model; and generating the result for the entity based on the determining.

Yet another aspect of the present disclosure involves a non-transitory machine-readable medium having stored thereon machine-readable instructions executable to cause a machine to perform operations comprising: accessing a first schema that is associated with a plurality of entities that are participants of an electronic system, each of the plurality of entities having a corresponding attribute, wherein each of a first subset of the plurality of entities has a respective value of the attribute that is less than a hardline threshold, and wherein each of a second subset of the plurality of entities has a respective value of the attribute that is greater than the hardline threshold; determining, according to the first schema, that data and/or transactions associated with the first subset of the entities are processed using a first model, and data and/or transactions associated with the second subset of the entities are processed using a second model different from the first model; generating a second schema at least in part by removing the hardline threshold, such that according to the second schema, data and/or transactions associated with the first subset of the entities and data and/or transactions associated with the second subset of the entities are each processed using a varying contribution from the first model and a varying contribution from the second model; and predicting, based on the second schema, a performance of the entity or deciding to approve or deny a request from the entity.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A method, comprising:
accessing, by one or more hardware processors of a service provider, a first schema, the first schema being associated with a plurality of entities that are participants of an electronic system, each of the plurality of entities having a corresponding attribute, wherein each of a first subset of the plurality of entities has a respective value of the attribute that is below a predefined threshold, and wherein each of a second subset of the plurality of entities has a respective value of the attribute that is above the predefined threshold;
determining, by the one or more hardware processors of the service provider according to the first schema, that data and/or transactions associated with the first subset of the entities are processed using a first model and no other models, and data and/or transactions associated with the second subset of the entities are processed using a second model but no other models, wherein the second model is different from the first model;
generating, by the one or more hardware processors of the service provider, a second schema at least in part by softening the predefined threshold such that according to the second schema, data and/or transactions associated with a predetermined majority of the first subset of the entities and data and/or transactions associated with a predetermined majority of the second subset of the entities are each processed using both the first model and the second model; and
implementing, by the one or more hardware processors of the service provider, the second schema in the electronic system.

2. The method of claim 1, wherein:
the first schema is implemented in the electronic system before generating the second schema; and
the implementing the second schema comprises replacing the first schema in the electronic system with the second schema.

3. The method of claim 1, further comprising evaluating, in response to implementing the second schema, an entity of the plurality of the entities based on the second schema, and wherein the evaluating the entity further comprises predicting a performance of the entity or deciding to approve or deny a request from the entity.

4. The method of claim 1, wherein the electronic system comprises an electronic commerce platform, an electronic social media network, a digital streaming service, or a healthcare marketplace.

5. The method of claim 1, wherein the softening is performed at least in part based on a sigmoid function.

6. The method of claim 1, wherein the softening the predefined threshold comprises generating a curve that approximates the predefined threshold.

7. The method of claim 6, wherein the softening the predefined threshold further comprises calculating a slope of the curve using an optimization algorithm.

8. The method of claim 1, wherein:
the softening the predefined threshold comprises generating a plurality of progressive thresholds that each have a corresponding first model involvement score and a corresponding second model involvement score;
the first model involvement score indicates a weight of the first model under the second schema;
the second model involvement score indicates a weight of the second model under the second schema; and
the predefined threshold is greater than a first subset of the progressive thresholds and less than a second subset of the progressive thresholds.

9. The method of claim 8, wherein the generating the second schema further comprises:
determining that, for the progressive thresholds below a first progressive threshold, the first model involvement score is negligible compared to the second model involvement score; and
determining that, for the progressive thresholds above a second progressive threshold, the second model involvement score is negligible compared to the first model involvement score;
wherein according to the second schema, only data and/or transactions associated with entities whose corresponding value of the attribute is between the first progressive threshold and the second progressive threshold are processed using both the first model and the second model.

10. The method of claim 1, wherein the attribute comprises a multi-dimensional attribute based on at least two different variables.

11. A system, comprising:
a non-transitory memory; and
one or more hardware processors coupled to the non-transitory memory and configured to read instructions from the non-transitory memory to cause the system to perform operations comprising:
accessing a first schema, the first schema being associated with a plurality of entities that are participants of an electronic system, each of the plurality of entities having a corresponding attribute, wherein each of a first subset of the plurality of entities has a respective value of the attribute that is below a predefined threshold, and wherein each of a second subset of the plurality of entities has a respective value of the attribute that is above the predefined threshold;
determining, according to the first schema, that data and/or transactions associated with the first subset of the entities are processed using a first model but no other models, and data and/or transactions associated with the second subset of the entities are processed using a second model but no other models, wherein the second model is different from the first model;
generating a second schema at least in part by softening the predefined threshold such that according to the second schema, data and/or transactions associated with a predetermined majority of the first subset of the entities and data and/or transactions associated with a predetermined majority of the second subset of the entities are each processed using both the first model and the second model; and
implementing the second schema in the electronic system.

12. The system of claim 11, wherein the operations further comprise evaluating an entity of the plurality of the entities based on the second schema, and wherein the evaluating the entity further comprises predicting a performance of the entity or deciding to approve or deny a request from the entity.

13. The system of claim 11, wherein the softening the predefined threshold comprises:
generating a curve that approximates the predefined threshold; and calculating a slope of the curve using an optimization algorithm.

14. The system of claim 11, wherein:

the softening the predefined threshold comprises generating a plurality of progressive thresholds that each have a corresponding first model involvement score and a corresponding second model involvement score;

the first model involvement score indicates a weight of the first model under the second schema; the second model involvement score indicates a weight of the second model under the second schema; and the predefined threshold is greater than a first subset of the progressive thresholds and less than a second subset of the progressive thresholds.

15. The system of claim 11, wherein the attribute comprises a multi-dimensional attribute based on at least two different variables.

16. A non-transitory machine-readable medium having stored thereon machine-readable instructions executable to cause a machine to perform operations comprising:

accessing a first schema, the first schema being associated with a plurality of entities that are participants of an electronic system, each of the plurality of entities having a corresponding attribute, wherein each of a first subset of the plurality of entities has a respective value of the attribute that is below a predefined threshold, and wherein each of a second subset of the plurality of entities has a respective value of the attribute that is above the predefined threshold;

determining, according to the first schema, that data and/or transactions associated with the first subset of the entities are processed exclusively using a first model, and data and/or transactions associated with the second subset of the entities are processed exclusively using a second model different from the first model;

generating a second schema at least in part by softening the predefined threshold such that according to the second schema, data and/or transactions associated with a predetermined majority of the first subset of the entities and data and/or transactions associated with a predetermined majority of the second subset of the entities are each processed using both the first model and the second model; and implementing the second schema in the electronic system.

17. The non-transitory machine-readable medium of claim 16, wherein the operations further comprise evaluating an entity of the plurality of the entities based on the second schema, and wherein the evaluating the entity further comprises predicting a performance of the entity or deciding to approve or deny a request from the entity.

18. The method of claim 1, wherein the second schema comprises a sliding scale of contributions from both the first model and the second model.

19. The non-transitory machine-readable medium of claim 16, wherein the softening the predefined threshold comprises generating a curve that approximates the predefined threshold.

20. The non-transitory machine-readable medium of claim 16, wherein:

the softening the predefined threshold comprises generating a plurality of progressive thresholds that each have a corresponding first model involvement score and a corresponding second model involvement score;

the first model involvement score indicates a weight of the first model under the second schema;

the second model involvement score indicates a weight of the second model under the second schema; and the predefined threshold is greater than a first subset of the progressive thresholds and less than a second subset of the progressive thresholds.

* * * * *